United States Patent [19]
Glad et al.

[11] Patent Number: 5,712,977
[45] Date of Patent: Jan. 27, 1998

[54] METHOD AND APPARATUS FOR INITIAL COUNTRY SELECTION IN A UNIVERSAL MODEM WITH CABLE

[75] Inventors: Thomas J. Glad; James T. Schley-May; Gregory S. Gillespie, all of Nevada City; David R. Kissinger, Pike; William L. Harris, Nevada City, all of Calif.

[73] Assignee: TDK Systems, Inc., Nevada City, Calif.

[21] Appl. No.: 529,867

[22] Filed: Sep. 18, 1995

[51] Int. Cl.$^6$ .............................. H04N 1/32; G06F 13/14
[52] U.S. Cl. .................. 395/200.09; 379/93; 395/200.12
[58] Field of Search ........................ 395/200.15, 200.16, 395/800, 200.12, 285, 200.01, 200.09; 379/98, 59, 93; 370/94.1, 95.1, 259, 400; 361/686; 365/230.03; 364/DIG. 1, DIG. 2

[56] References Cited

U.S. PATENT DOCUMENTS

| | | | |
|---|---|---|---|
| 4,868,863 | 9/1989 | Hartley et al. | 379/98 |
| 4,922,687 | 5/1990 | Chow et al. | 53/472 |
| 5,134,648 | 7/1992 | Hochfield et al. | 379/98 |
| 5,182,699 | 1/1993 | Kobayashi et al. | 361/683 |
| 5,187,645 | 2/1993 | Spalding et al. | 361/686 |
| 5,263,003 | 11/1993 | Cowles et al. | 365/230.03 |
| 5,430,793 | 7/1995 | Ueltzen et al. | 379/98 |
| 5,533,029 | 7/1996 | Gardner | 370/94.1 |

Primary Examiner—Daniel H. Pan
Attorney, Agent, or Firm—Hecker & Harriman

[57] ABSTRACT

The present invention provides apparatus and method for connecting Data Terminal Equipment (DTE) to communication networks. The present invention provides an adaptable universal modem that can be reconfigured to meet different specifications in different countries, thereby allowing a user to use a single universal modem across different specifications in different countries. The universal modem includes a microcontroller, a programmable data pump, and a programmable DAA. A user reads a particular country code on each country's unique identifier and provides the information to a modem setup program. The modem setup program configures the universal modem according to the country information entered by the user, thereby permanently storing the home country code in modem flash memory. The universal modem of the present invention reverts to a default home configuration upon power-up to meet the requirements of various PTT (Postal Telephone & Telegraph) authorities. The country code can be changed after power-up by entering a country code change command in the modem setup program.

49 Claims, 12 Drawing Sheets

| J1 | | | CONTROLLER | |
|---|---|---|---|---|
| A0 | 29 | MA0 | MA0 | |
| A1 | 28 | MA1 | MA1 | ZD(0..7) |
| A2 | 27 | MA2 | MA2 | |
| A3 | 26 | MA3 | MA3 | ZA(0..4) |
| A4 | 25 | MA4 | MA4 | |
| A5 | 24 | MA5 | MA5 | ZRD- |
| A6 | 23 | MA6 | MA6 | ZWR- |
| A7 | 22 | MA7 | MA7 | MCSO- |
| A8 | 12 | MA8 | MA8 | |
| A9 | 11 | MA9 | MA9 | MRST- |
| A10 | 8 ✗ | | | |
| A11 | 10 ✗ | | | |
| A12 | 21 ✗ | | | MINT |
| A13 | 13 ✗ | | | AUDIO |
| A14 | 14 ✗ | | | |
| A15 | 20 ✗ | | | |
| A16 | 19 ✗ | | | XTXD |
| A17 | 46 ✗ | | | MRXD |
| A18 | 47 ✗ | | | MTXC |
| A19 | 48 ✗ | | | MRXC |
| A20 | 49 ✗ | | | RINGO |
| A21 | 50 ✗ | | | |
| A22 | 53 ✗ | | 203 | |
| A23 | 54 ✗ | | | |
| A24 | 55 ✗ | | | |
| A25 | 56 ✗ | | | |
| D0 | 30 | M00 | M00 | RDRNG- |
| D1 | 31 | M01 | M01 | LS- |
| D2 | 32 | M02 | M02 | |
| D3 | 2 | M03 | M03 | DM- |
| D4 | 3 | M04 | M04 | COA- |
| D5 | 4 | M05 | M05 | COB- |
| D6 | 5 | M06 | M06 | DATA- |
| D7 | 6 | M07 | M07 | CLK- |
| D8 | 64 ✗ | | | |
| D9 | 65 ✗ | | | COATA |
| D10 | 66 ✗ | | | |
| D11 | 37 ✗ | | | |
| D12 | 38 ✗ | | | |
| D13 | 39 ✗ | | | |
| D14 | 40 ✗ | | | |
| D15 | 41 ✗ | | | |

METHOD AND APPARATUS FOR INITIAL COUNTRY SELECTION IN A UNIVERSAL MODEM WITH CABLE

BACKGROUND OF THE INVENTION

1. Field of the Invention

This invention relates to the field of data communication equipment (DCE) and in particular to a reconfigurable universal modem.

2. Background Art

Telephone systems were originally designed for voice communication. As new technologies have emerged, methods have been devised to transmit other types of information over telephone lines. These methods typically require the connections of other equipment besides the voice telephone set to the telephone line. Examples of such equipment include computer modems, facsimile ("fax") machines, answering machines, voice mail systems, phone patches, automatic number identification or "Caller ID" systems, and advanced telephone systems. The signals present within the above equipment often have different electrical characteristics than the signals that may be transmitted on a telephone line. Thus, an interface is required to connect such equipment to a telephone line and to translate between the equipment signals and the telephone line signals.

A modem is a device that enables two digital electronic systems to communicate over the telephone network. The telephone network is a single-twisted pair of wires. Digital equipment systems, on the other hand, require two separate paths of communication to communicate with each other. Thus each digital system must have transmit and receive capability. The modem is inserted between the digital computer and the analog telephone system, thereby providing the necessary interface between the telephone network and digital systems over a single twisted pair of wires. The modem accepts a serial stream of bits as input and produces a modulated carrier as output, thus converting the digital signals of the computer to analog signals for transmission on telephone lines, or vice versa.

Before connecting the output of the modem to a dial-up switched telephone line, regional telephone companies require that a DAA (Data Access Arrangement) be placed in series between the modem and the line. Traditionally, especially for computer modems, a DAA is used to connect equipment to a telephone line. A DAA typically provides isolation, impedance matching, hybrid circuit and sometimes amplification, filtering and control functions.

Data communication equipment such as a modem is well known and developed. Various organizations have proposed specifications and standards to permit a uniformity and compatibility, thereby allowing modems of different manufacturers to communicate with one another. For example, the International Telecommunication Union (ITU, formerly called CCITT or Comité Consultatif International de Télégraphique et Téléphonique) has published a number of V-series recommendations for modems. Two of the commonly used modem signaling system standards have been established by AT&T.

When a modem crosses an international border, however, both the users and the markets served by the telecommunication companies become international and the issue of international compatibility becomes critical. Since each country develops and maintains its own telephone network standard, there is no single standard in international telephony. For example, U.S. users and companies use U.S. communication infrastructure to communicate with parties overseas, and foreign parties will use their own infrastructure to communicate with parties in the United States.

Each country uses different specifications and parameter values for its telephone network communication. For example, different countries have different requirements for parameters such as Return Loss Figure (RLF), Out-of-band signal levels, Off-hook D.C. characteristics, and Ring Detection requirements. In pulse dialing, different countries have different values for such parameters as make/break (length of time a signal is generated/length of time no signal is generated) ratio, interdigit gap, and pulses per second. With its own procedures and regulations, each country makes it illegal to connect unapproved equipment to the telephone network of that country. The user, therefore, needs to have a separate modem tailored for each different country he or she intends to travel and use the telephone network in.

In most countries, neither a data pump (data handling circuit) nor DAA can be certified for use on the country network. Only the complete modem including a data pump and a DAA can be certified for use on the country network. In this context, a modem implies the combination of a data pump and a DAA. A user then would need a different data pump and DAA combination for each different country and accordingly, different modem (a data pump plus a DAA) should be provided to the user.

Figure 1:
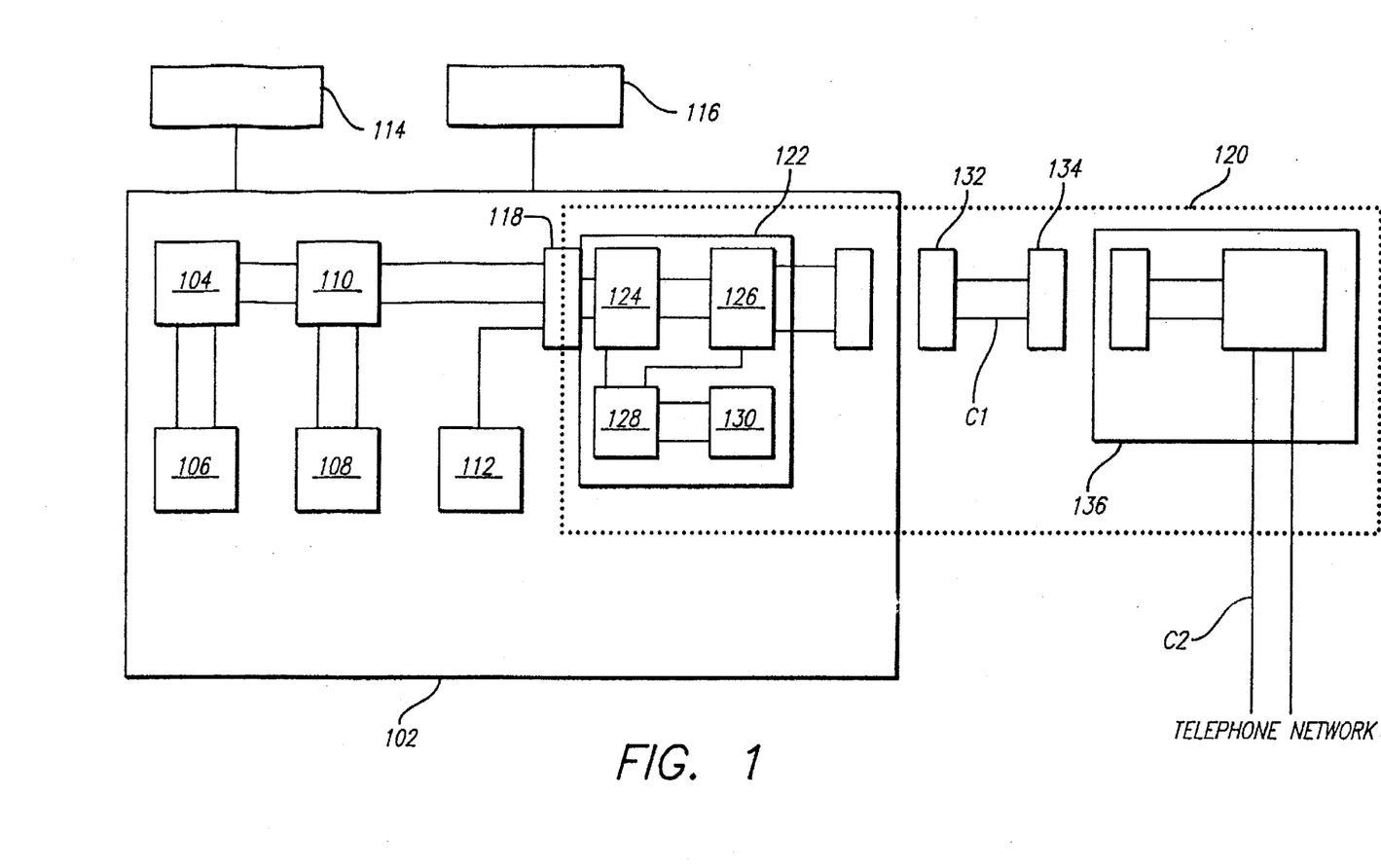
FIG. 1 is a block diagram of a prior art reconfigurable modem.

One prior art method for providing an international modem is found in European patent No. 0 418 164 A1 to Hochfield and Bocquet. FIG. 1 shows Hochfield and Bocquet system, which is directed to a modem for connecting a computer to a telephone network for data transmission. In FIG. 1, modem 120 is comprised of main modem card 122 residing in computer 102 and auxiliary card 136 outside computer 102. Auxiliary modem card 136 includes an interface circuit for an analog telephone line.

Main modem circuit 122 comprise mother board connector 118, computer interface 124, microcontroller 128, modulator/demodulator 126, memory 130. Mother board connector 118 is coupled to computer interface 124, which is also coupled to modulator/demodulator 126 and microcontroller 128. Microcontroller 128 is coupled to memory 130.

Computer 102 is comprised of processor circuit 104, I/O circuit 110, mass memory 108, memory circuit 106, and power supply 112. Computer 102 also houses main modem card 122. Main modem card 122 is coupled to I/O circuit 110 through mother board connector 118. Power supply 112 is coupled to main modem circuit 122 through mother board connector 118. Main modem card is sometimes called data pump and handles data modulation and demodulation. Mass memory 108 is coupled to I/O circuit 110, which is also coupled to processor circuit 104. Processor circuit 104 is also coupled to memory circuit 106. Main modem circuit 122 is coupled to auxiliary modem circuit 136 by conductor cable C1. Auxiliary modem card is sometimes called data access arrangement (DAA) and provides interface between a computer and telephone network. Auxiliary modem card 136 is coupled to a telephone network through cable C2.

In Hochfield and Bocquet, a specific country identification is stored in auxiliary modem card 136 permanently. The specific country identification code is representative of the country for which the auxiliary card is designed. Main card 122 interrogates auxiliary card 136 to find the stored country identification code and configure its software accordingly. By interrogating auxiliary card 136 and reading country identification code, the system prevents adoption of the auxiliary card that contains wrong country identification codes.

Unlike the present invention, therefore, Hochfield and Bocquet needs to provide a country-specific hardware DAA with hardcoded country identification code. This leads to significant cost overhead and an inflexible modem architecture.

SUMMARY OF THE INVENTION

The present invention provides apparatus and method for connecting Data Terminal Equipment (DTE) to communication networks. Communication networks, especially in the international domain, have different specifications and regulations for a Data Communication Equipment (DCE), e.g. a modem, to meet before the DCE can be used to connect a DTE and the communication networks. The present invention provides an adaptable universal modem that can be reconfigured to meet different specifications, thereby allowing a user to use a single universal modem across different specifications in different countries, using any PCMCIA standard compliant host.

The universal modem of the present invention includes a microcontroller, a programmable data pump, and a programmable DAA. The microcontroller includes storage means for tables of country parameters for a plurality of predetermined countries. A modem setup program requests a user to read a country ID code from a country label. Thus the present invention provides a method to transmit country information from a modem connector or a country label to a modem, thereby eliminating prior art requirement of hard-coded country ID codes and providing a cost advantage with an efficient design. The setup program configures the universal modem including the data pump and DAA according to the country information entered by the user.

The universal modem of the present invention reverts to a default home configuration upon power-up to meet the requirements of the regional telephone companies. The country ID code can be changed after power-up by entering a country code change command in the modem setup program.

DETAILED DESCRIPTION OF THE INVENTION

The present invention is a country selection method described with respect to universal modems. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

Advances in computer and communication technology have brought global networking capability to personal computer users. A portable personal computer equipped with a modem can connect to any site in the world only bounded by worldwide networking infrastructure. When a user, however, travels across international borders with his or her computer and desires to connect the computer to public telephone line of some other country, the user needs to solve the compatibility problem between his or her home country's telephone network and the other country's. At present, a given modem is designed and approved for a given country and it can operate properly and legally in that country only. Also, most countries provide unique connectors with special marking requirements to help users properly use modems in their countries.

Thus, when a computer with a modem adapted to a first country travels to another country and needs to access the telephone network in that country where it has different specifications, the computer needs a separate modem adapted to that country. If the computer had an external modem, the external modem would have to be replaced with another external modem for that country. If the computer had an internal modem, the computer housing would have to be opened to remove the existing internal modem and replace it with a different internal modem.

These procedures are inconvenient and require an extra modem for each different country. This translates to cost overhead because of the need to have the extra modem available and install it. If the user is not properly trained or is not knowledgeable enough about the procedures, he or she will have to resort to other resources than him or her self, which will also add to the time and cost overhead.

The present invention offers a method to transmit the information from a modem connector or a country label to modem firmware, thereby providing a cost advantage with a simple architecture. The present invention provides a country label on a modem connector or modem case and allows the user to read the country ID code off the label and provide the information to a host program to reconfigure the modem and adapt the modem to different countries. The present invention also provides means to meet requirements of various PTT (Postal Telephone & Telegraph) authorities that a modem revert to country of origin configuration by default.

Figure 2A:
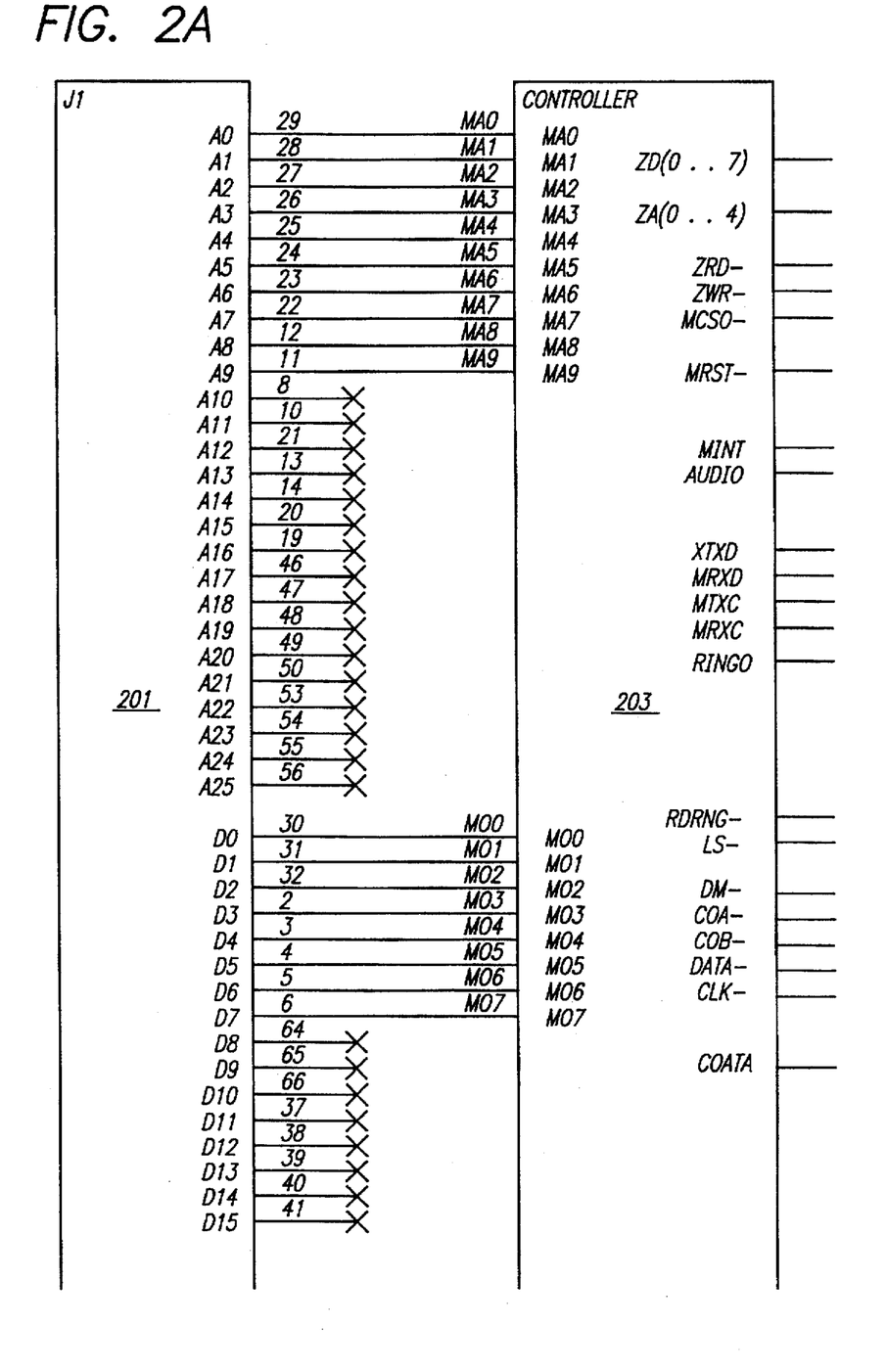
FIG. 2 is the schematic diagram of the preferred reconfigurable modem of the invention.
Figure 2B:
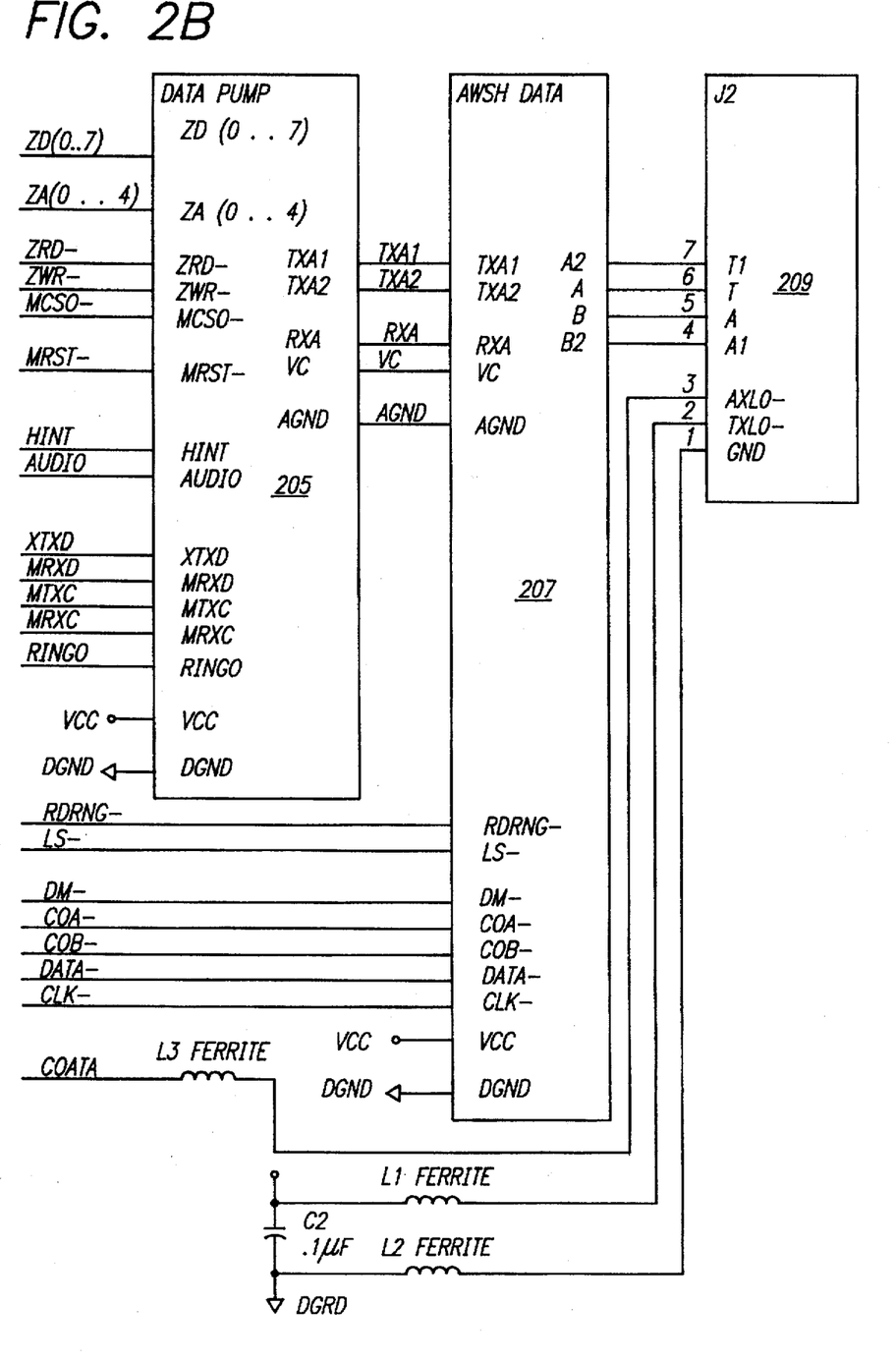
Figure 2C:
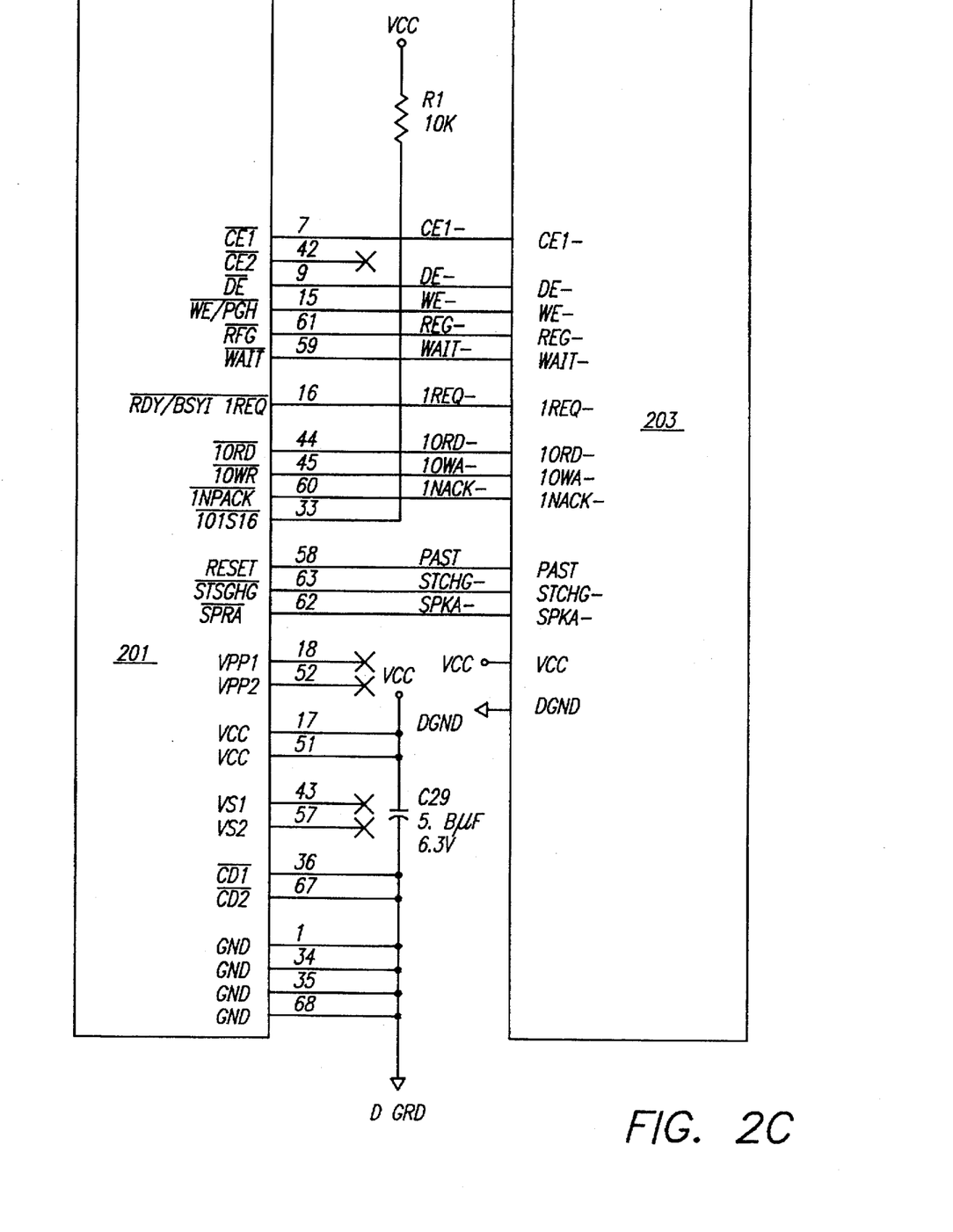

FIG. 2 shows the schematic diagram of the preferred reconfigurable modem of the invention. The modem in FIG. 2 is reconfigurable to meet the requirements of different country's telephone network regulations and specifications.

PCMCIA (Personal Computer Memory Card International Association) interface 201 is coupled to microcontroller 203 through lines (HA0, HA1, HA2, . . . , HA9) and lines (HD0, HD1, HD2, . . . , HD7). PCMCIA interface 201 also communicates with microcontroller 203 through lines CE-, OE-, WE-, REG-, WAIT-, IORD-, IOWR-, INACK-, PRST, STCHG-, and SPKR-. In the preferred embodiment, JAE-64 is used as PCMCIA interface 201. However, any suitable PCMCIA compliant interface device can be used for this purpose. Microcontroller 203 is coupled to data pump 205 through buses (ZD0, ZD1, ZD2, . . . , ZD7) and (ZA0, ZA1, ZA2, ZA3, ZA4). Lines ZRD-, ZWR-, MCSO-, MRST-, MINT, AUDIO, XTXD, MRXD, MTXC, MRXC, RINGD are also used to couple microcontroller 203 and data pump 205. Microcontroller 203 is coupled to DAA 207 through lines RDRNG-, LS-, OH-, COA-, COB-, DATA-, and CLK-.

Data pump 205 is coupled to DAA 207 through lines TXA1, TXA2, and RXA. DAA 207 is coupled to telephone line interface 209 through lines A, B, A2, and B2. Telephone line interface 209 is coupled to a country connector, which, external to the modem and not shown in FIG. 2, is coupled to public telephone line. Microcontroller 203 is coupled to telephone line interface 209 through line CDATA. Microcontroller 203 coordinates overall modem operation by controlling data pump 205, DAA 207, and telephone line interface 209.

To configure the modem for a specific country, a country setup routine running on a PCMCIA host issues a command to a user to select a desired country. When a country identification (ID) code is read from the country connector and provided by the user, the PCMCIA host sends command instructions to microcontroller 203 to configure data pump 205 and DAA 207 by loading various delays and parameters that meet the requirements of the country's telephone network. In alternate embodiments of the invention, the country identification code can be indicated on any other suitable means such as modem case or modem shipping box.

In FIG. 2, the PCMCIA host outputs bits in parallel to represent the data to be sent. The data is then converted to serial bit stream and microcontroller 203 feeds the serial bit stream to data pump 205, which modulates the digital data and outputs to DAA 207. The modulated output from DAA 207 is then transmitted to local telephone network through telephone line interface 209. At the receiving end of telephone network, the incoming signal is demodulated back to serial bit stream by data pump 205 and converted to parallel data for input to the PCMCIA host.

Figure 3:
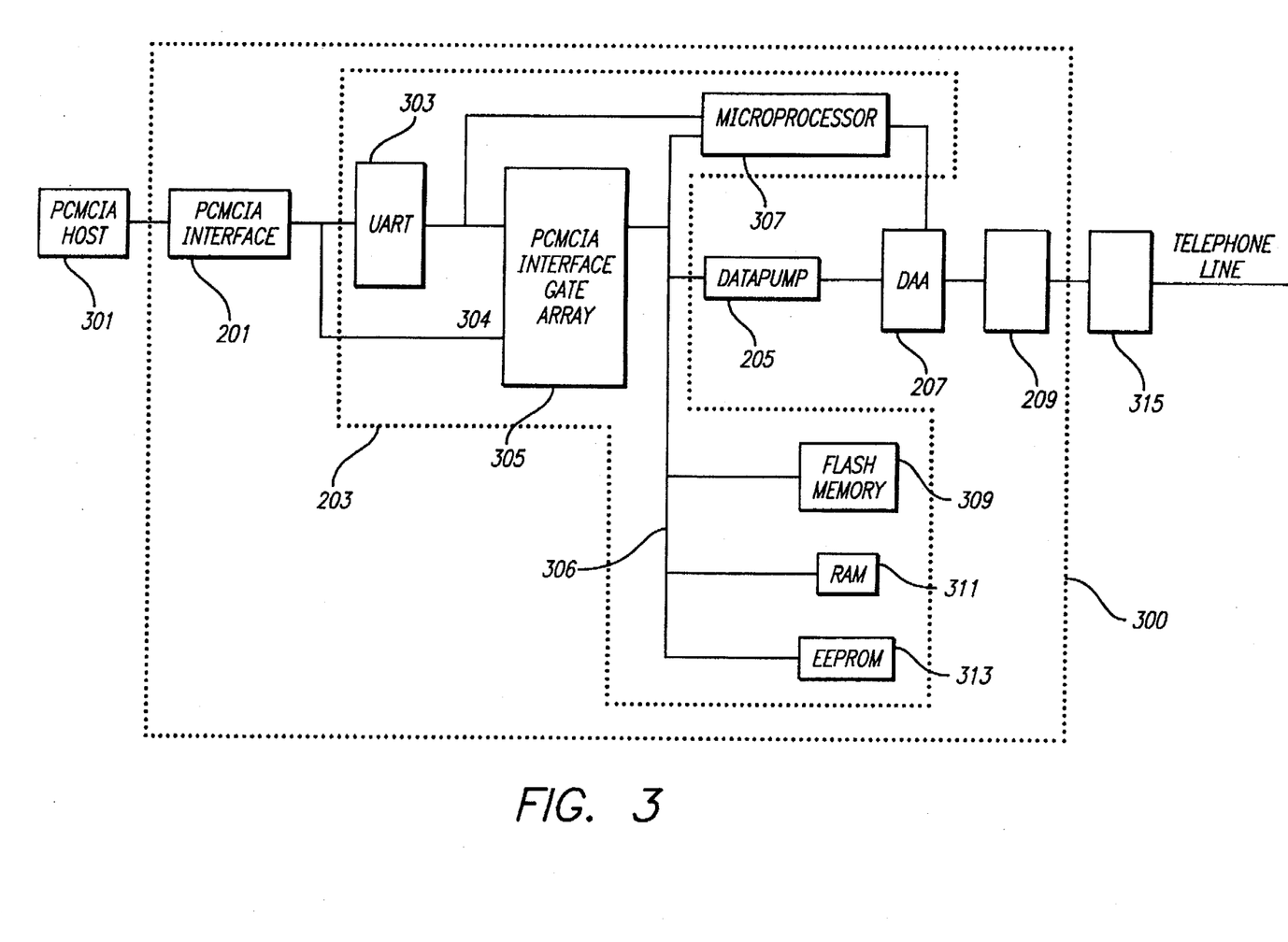
FIG. 3 is a block diagram of the preferred embodiment of the present invention.
Figure 4A:
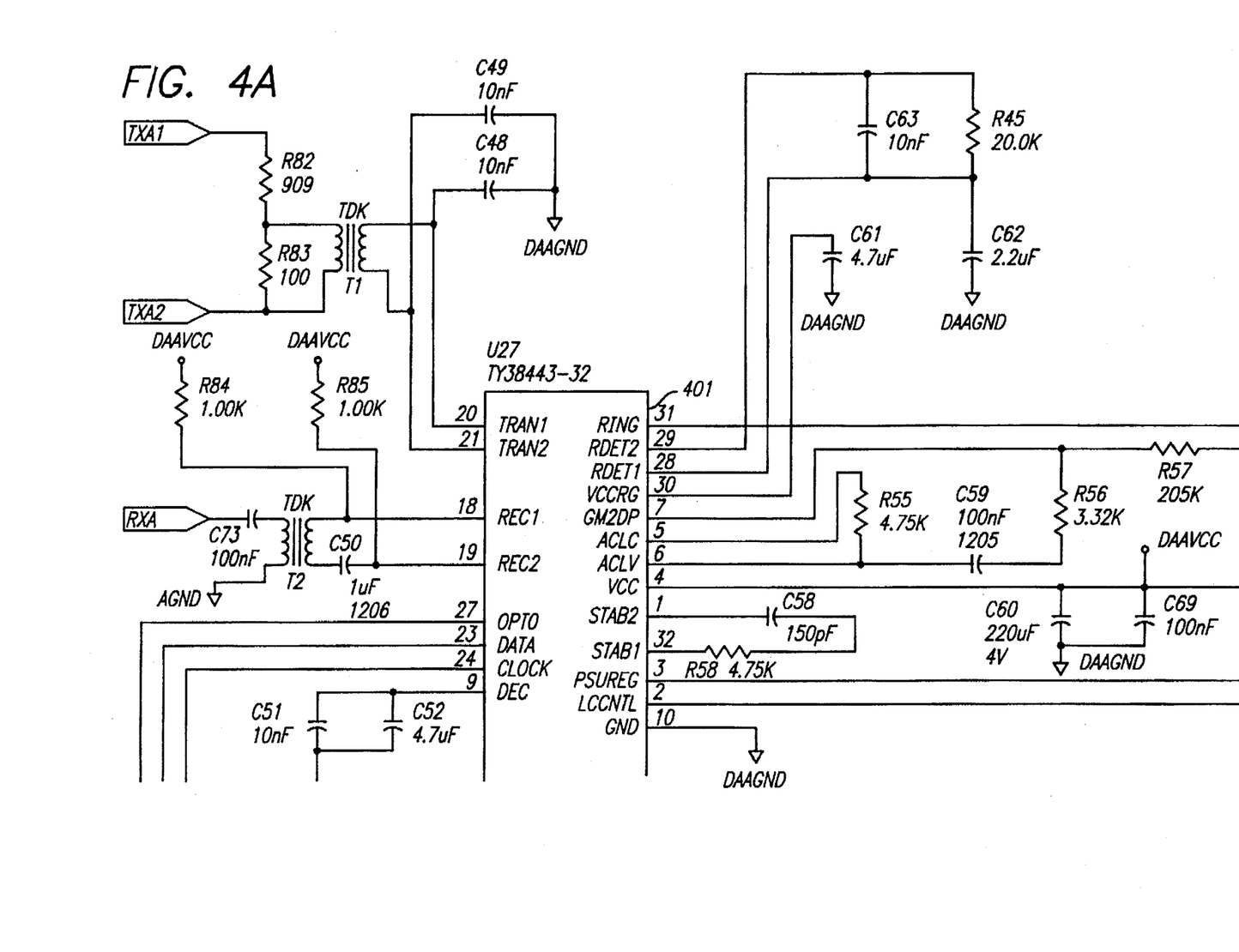
FIG. 4 is a schematic diagram of the DAA circuitry of FIG. 3.
Figure 4B:
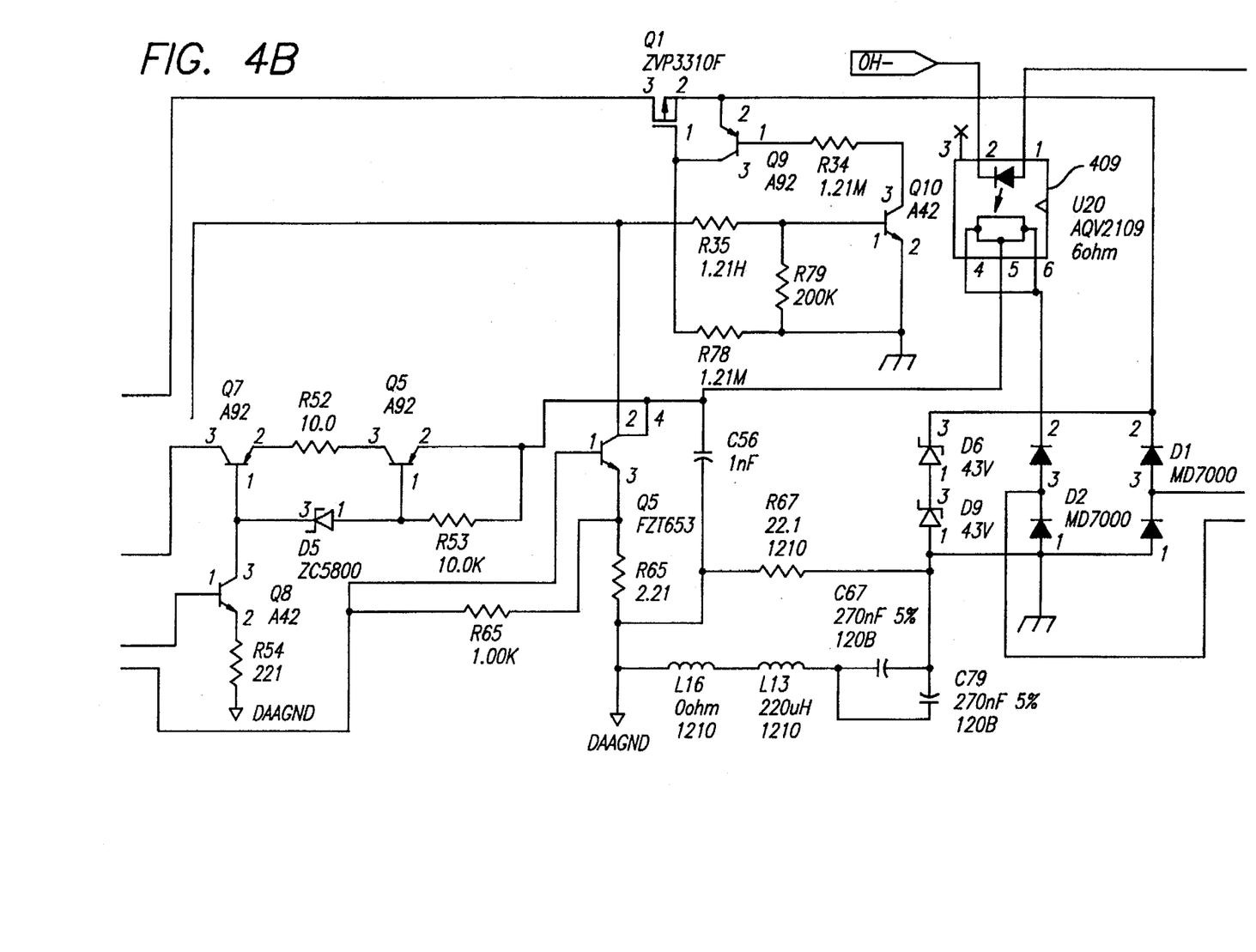
Figure 4C:
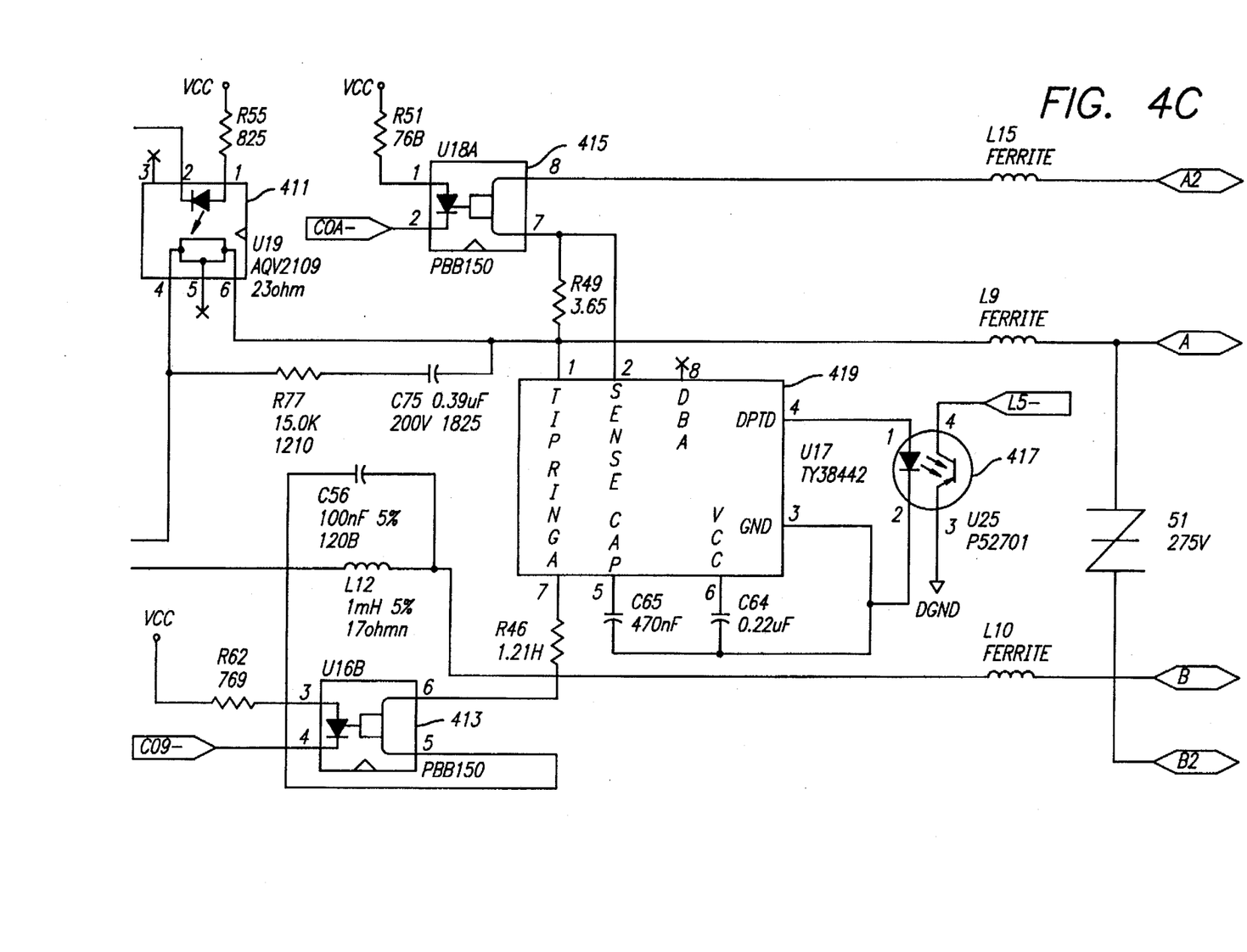
Figure 4D:
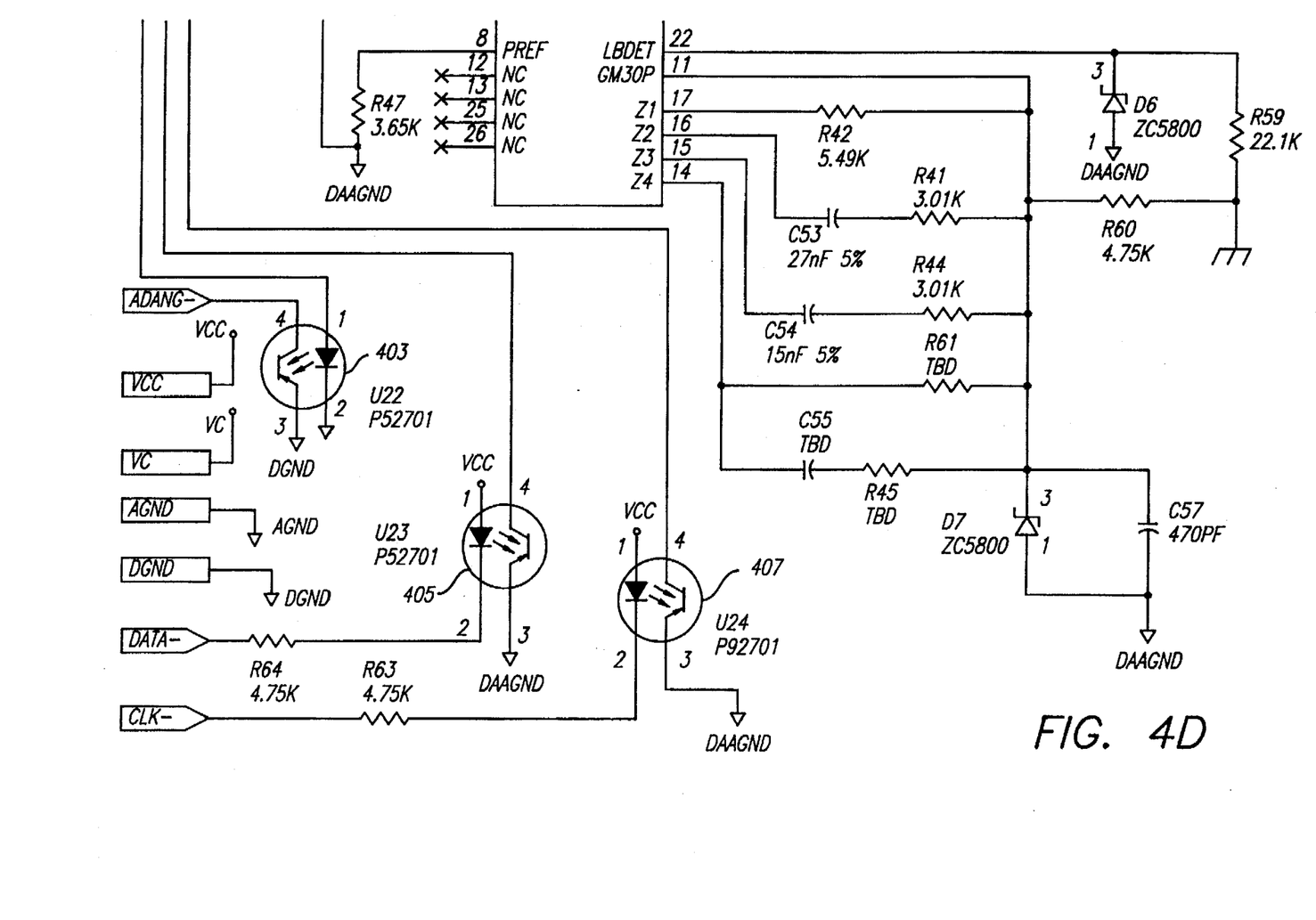

FIG. 3 shows a detailed schematic of the preferred embodiment of the present invention. Modem 300 comprises PCMCIA interface 201, microcontroller 203, data pump 205, DAA 207, and telephone line interface 209. Microcontroller 203 comprises UART (Universal Asynchronous Receiver Transmitter) 303, gate array 305, microprocessor 307, flash memory 309, RAM (Random Access Memory) 311, and EEPROM (Electrically Erasable Programmable Read-only Memory) 313. In this preferred embodiment, UART 303 is Silicon Systems Inc. 73m550, gate array 305 TDK HCB 00051, and microprocessor 307 ZILOG Z80182. UART 303 provides a communication interface between PCMCIA host 301 and microprocessor 307 by converting serial data to parallel data and vice versa.

As shown in FIG. 3, PCMCIA compliant host 301 is coupled to PCMCIA interface 201, which is coupled to UART 303 and PCMCIA interface gate array 305. UART 303 is coupled to gate array 305 and microprocessor 307. Microprocessor 307 is also coupled to DAA 207 and ZD Bus 306. Also coupled to ZD bus 306 are gate array 305, data pump 205, flash memory 309, RAM 311, and EEPROM 313. Data pump 205 is coupled to DAA 207, which is coupled to telephone line interface 209. Telephone line interface 209 is coupled to country connector 315, which is connected to public telephone line Telco.

Gate array 305 performs PCMCIA interface functions as well as address decoding, I/O expansion for microcontroller 203, and clock generation for UART 303. Gate array 305 also performs data multiplexing, and contains registers for parallel ports. Gate array 305, flash memory 309, RAM 311, EEPROM 313 are supervised by microprocessor 307.

A DTE is typically a terminal, computer, or personal computer. In FIG. 3, PCMCIA host 301 denotes a DTE and can be implemented by any PCMCIA standards-compatible host. PCMCIA interface 201 provides an interface between PCMCIA (Personal Computer Memory Card International Association) host 301 and microcontroller 203. PCMCIA host 301 and interface 201 are used to support and provide PCMCIA compatibility, which supports a broad range of devices including modems, fax-modems, LAN adapters, cellular communications, flash memory, EEPROM, RAM, and rotating and solid-state storage.

Flash memory 309 stores program memory and tables for country parameters for all predetermined countries as well as country of origin ID code. To configure data pump 205 and DAA 207, microprocessor 307 looks up the country tables in flash memory 309, obtains country parameters for a particular country of choice, and loads data pump 205 and DAA 207 with appropriate parameter values. Microprocessor 307 receives command instructions from PCMCIA host 301 through serial interface 303 and from program memory in flash memory 309.

RAM 311 stores data memory for microprocessor and is used for CCITT V.42bis compression tables. EEPROM 313 stores temporary country configuration data. Microprocessor 307 accesses flash memory 309, RAM 311, and EEPROM 313 through bus 306, as shown in FIG. 3.

Any suitable country identifier can be used to represent the country's identification. A country identification code can be provided, for example, on a country connector, modem case, or even on a modem shipping box. In the preferred embodiment of the present invention, each country provides a unique country connector in the form of a connector or a cable with special marking requirements such as country connector 315 shown in FIG. 3. Country connector 315 of the preferred embodiment has a country label attached to it so that the user can read and identify a country ID code off the label.

Also, different coding schemes can be used on a country identifier to designate different countries. Table 1 shows an example of different coding schemes that can be used in conjunction with the present invention. It would be appreciated, however, that any other unique numbering system or coding scheme can be used for this purpose.

TABLE 1

| Country | T.35 Code | Standard Code | Sequential Code |
|---------|-----------|---------------|-----------------|
| U.S. | 181 | USA | 0 |
| Japan | 0 | J | 1 |
| France | 15 | F | 2 |
| Finland | 119 | SF | 3 |

When PCMCIA host 301 wants to send data over telephone line using modem, PCMCIA host 301 makes data available along with other control signals at PCMCIA interface 201. Data from PCMCIA host 301 for transmission is in parallel format. PCMCIA interface 201 then routes data and control information to UART 303, which converts parallel data from PCMCIA host 301 to serial data and feed to gate array 305 so that the information can be sent over a single line. The least significant bit (LSB) is sent first and the most significant bit (MSB) is sent last. The serial bit stream cannot be transmitted directly, but is first converted to a modulated carrier that can be sent over the telephone line. Microprocessor 307 feeds digital data to data pump 205, which provides the necessary conversion by modulation/demodulation. Data pump 205 contains country specific parameters such as filter shapes, frequency of various call progress tones. Data pump 205 can be implemented using off-the-shelf semiconductor products such as Rockwell RC288DPL chip set.

To accommodate different country parameters for different countries, the present invention uses DAA 207, which is a programmable IC that controls the DC mask characteristics as well as the AC impedance and ring detection characteristics in conjunction with associated external components.

Microprocessor 307, after receiving instructions from PCMCIA host 301, performs modem configuration for a particular country selected by the user. The modem configuration includes microprocessor 307 reading country ID code out of nonvolatile memory EEPROM 313 and accessing tables in flash memory 309 for country parameters. Microprocessor 307 sends control data to data pump 205 and DAA 207 for a country specific configuration, which includes setting such parameters as tone dial on period, tone dial off period, pulse dial make/break ratio, ringing cadence, and frequency detection of call progress tones.

FIG. 4 shows a schematic diagram of DAA circuitry in FIG. 3. When modem is ready to transmit data, data pump 205 provides analog transmit signal to DAA 401, which receives this analog signal and modulates a line hold transistor so that the signal is impressed on A, B. DAA 401 has an internal gain of 15 dB to A, B.

DAA 401 can also detect an incoming ring signal by processing the ring voltage appearing on A,B and outputting a digital version to microprocessor 307. In this preferred embodiment, Motorola TY38443 is used for DAA 401. However, any suitable off-the-shelf semiconductor devices can be used for DAA 401. In receive path, any AC information appearing on A, B is received by DAA 401 and provided to data pump 205. The gain from A, B to transmit pin of DAA 401 is −9 dB.

Line current flows through Q5, R66, and R67. DAA 401 senses DC current and AC current through R67. DAA 401 maintains DC mask characteristics by sensing DC current and comparing this sensed information to internally programmed DC references. AC impedance characteristics are maintained the same way by internally comparing to one of the external impedances shown at pins Z1, Z2, Z3, or Z4. These impedances are scaled and transformed images of the actual line impedances. Z1 corresponds to 600 Ω, Z2 to the UK complex, Z3 to the German complex, and Z4 is not used.

A power supply is derived from the telephone line and provided to DAA 401 by a voltage regulator circuit. Programmable DAA 401 is powered from the phone line through a series pass voltage regulator. DAA 401 uses this power for its own operation only. DAA 401 is capable of staying up during loop current lapses of up to 300 ms. This is required during pulse dialing and in some countries such as France where loop current lapses must be tolerated.

Optocouplers 405 and 407 are used to provide barrier isolation and digital communication from micro controller 203 to DAA 401. Programming of DAA 401 occurs through optocouplers 405 and 407 right after going off-hook. Microcontroller 203 communicates with DAA 401 either by a serial programming sequence after going off-hook or by the static levels presented to DAA 401, which are read during the ring detect period. Optocoupler 403 transmits ring detect information or, after the modem is off-hook, loop current status information. In the preferred embodiment, NEC 2701 is used for optocouplers 403, 405 and 407.

The analog transmit signal, emanating from data pump 205 appears differentially at TXA1, TXA2 and is provided to DAA 401, which provides barrier isolation and has a ratio of 1:1. DAA 401 receives this analog signal and the signal is impressed on the line (A,B). DAA 401 has an internal gain of about 15 dB to the line, so unity gain is preserved with respect to transmit level.

Any AC information appearing on the line is received by DAA 401. C50 AC couples this information to T2. C73 AC couples the received signal to data pump 205 at RXA. The gain from the line to RXA is −9 dB, which is 3 dB less than the '6 dB value that the data dump expects. Therefore, some firmware corrections are made in the call progress filter thresholds in countries where it is necessary.

An incoming ring signal flows through C75 and R77, and is then full wave rectified by diode bridge D1, D2. The ring voltage across diode bridge D1 and D2 is processed and a digital version is output at DAA 401 OPTO pin, which is coupled to optocoupler 403. C63 provides compensation when operating in the German ring detect mode, which requires additional noise filtering circuitry. C61 is the ringer supply capacitor and charges to about 5V.

Pulse dialing is initiated when microcontroller 203 issues the pulse dial command sequence to DAA 401. Pulse dial breaks are generated by turning off PSUREG and LCCNTL of DAA 401 simultaneously. This opens the line hold loop and also the power supply regulation loop. When DAA 401 is in pulse dial mode, its current consumption is reduced during breaks, and C60 will remain charged for longer than a typical break, thereby enabling DAA 401 to retain its programming.

The present invention uses the standard 2-wire version on A, B. Both wires are filtered by ferrite beads to help reduce EMI emissions to the phone line. Sidactor S1 provides lighting surge protection. The 4-wire version of this product also supports the A2, B2 leads, which provide connections to the downstream telephone set. A2, B2 leads are controlled by normally closed opto-relay 415. Loop current in the downstream path is sensed across R49 by block 419. Block 419 provides pulses across the barrier through optocoupler 417 if loop current is flowing. Block 419 contains comparators and special circuitry to work with either polarity. Any suitable off-the-shelf semiconductor device can be used for block 419. In the preferred embodiment of the present invention, Motorola TY38442 is used for block 419.

C66 and L12 form the series part of the 16 KHz filter, which is required for Germany. The impedance of C66 and L12 becomes high at 16 KHz. The shunt network is across the sense resistor in the line hold loop which sets DC and AC impedance. This network has also a low Z notch as 16 KHz which has the affect of lowering the DAA's 401 input impedance. These two factors together constitute a voltage divider which significantly attenuates 16 KHz billing tones. Leaving the filter in for all countries actually improves the high frequency return loss characteristics slightly and has no negative effects.

R59 monitors the loop current across R67 and feeds the information to LBDET, which is used to sense breaks in the loop current and alert microprocessor 307.

C48, C49, C57, and C56 are used to reduce EMI susceptibility. D6 and D7 are required to prevent latchup under certain conditions. C51 and C52 form a decoupling capacitor which memorizes DC line current during AC operations and pulse dialing. R47 is provided to set the internal current reference of DAA 401.

Figure 5:
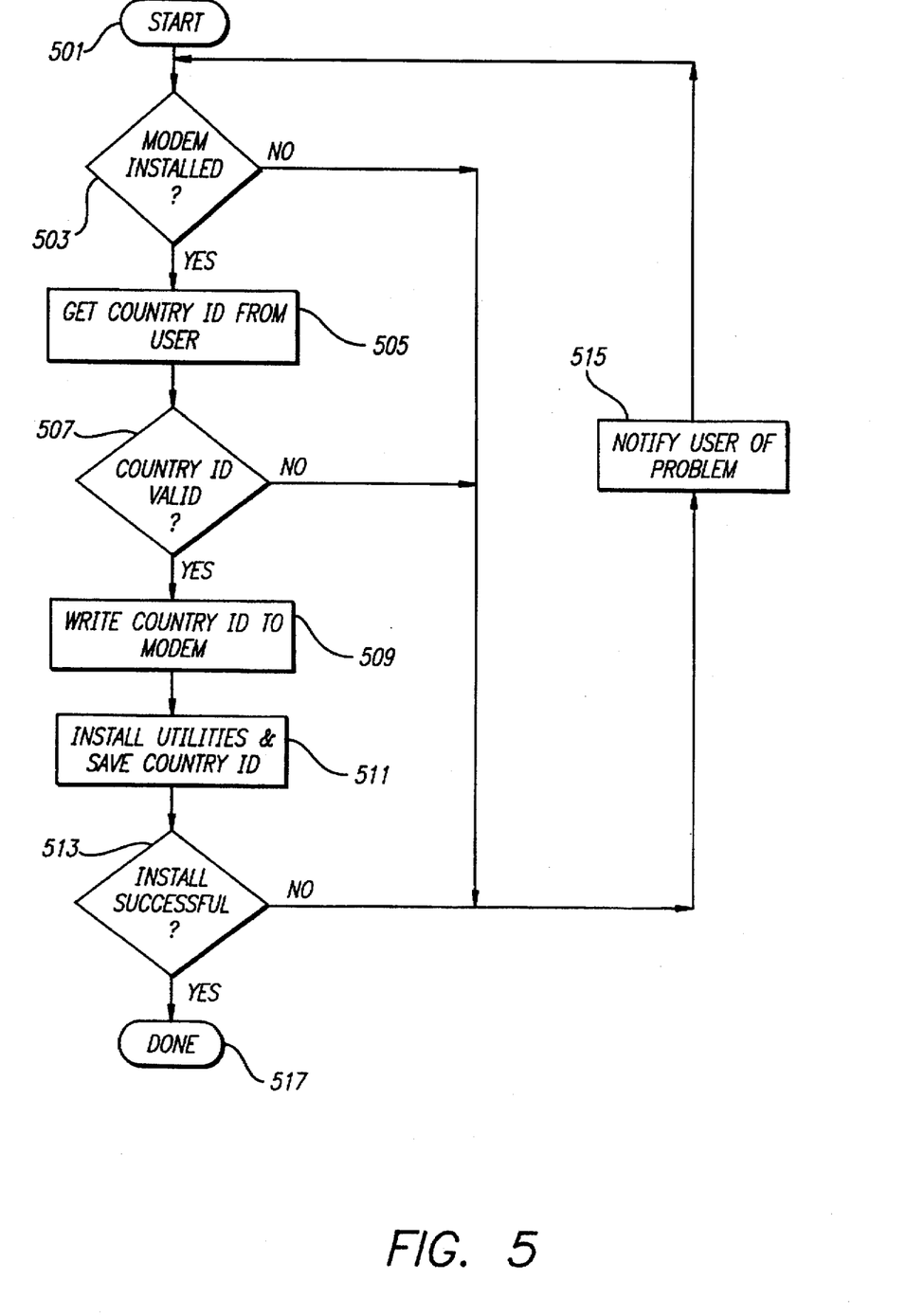
FIG. 5 is a flowchart illustrating the utility setup routine of the present invention.

FIG. 5 is a flowchart illustrating the country setup routine of the present invention. After start in step 501, the setup routine in PCMCIA host 301 checks if a modem is installed in the system in step 503. If the setup routine does not find a modem installed, the routine notifies the user of the problem and waits until a modem is installed. If a modem is found installed, in step 505 the routine asks the user to get a country ID from country label provided on a country identifier and enter the country ID. In step 507, if the entered country ID is not valid, the routine goes to step 515 and reports the problem to the user. If the entered country ID is a valid one, the routine writes the country ID to modem's flash memory 309 in step 509. In step 511, the routine installs utilities and saves country ID.

Step 513 checks if the installation is successful and if successful, the setup routine is complete and modem is ready for data transmission. The modem configuration operation includes the configuration of data pump 205 and DAA 207 for the requirements of that country and loading various delays and parameters so that modem can operate to the regulations and specifications of that country. After configuring modem 300, the setup routine enables modem and returns control to modem 300 so that the user can start using modem for his or her communication needs.

Figure 6:
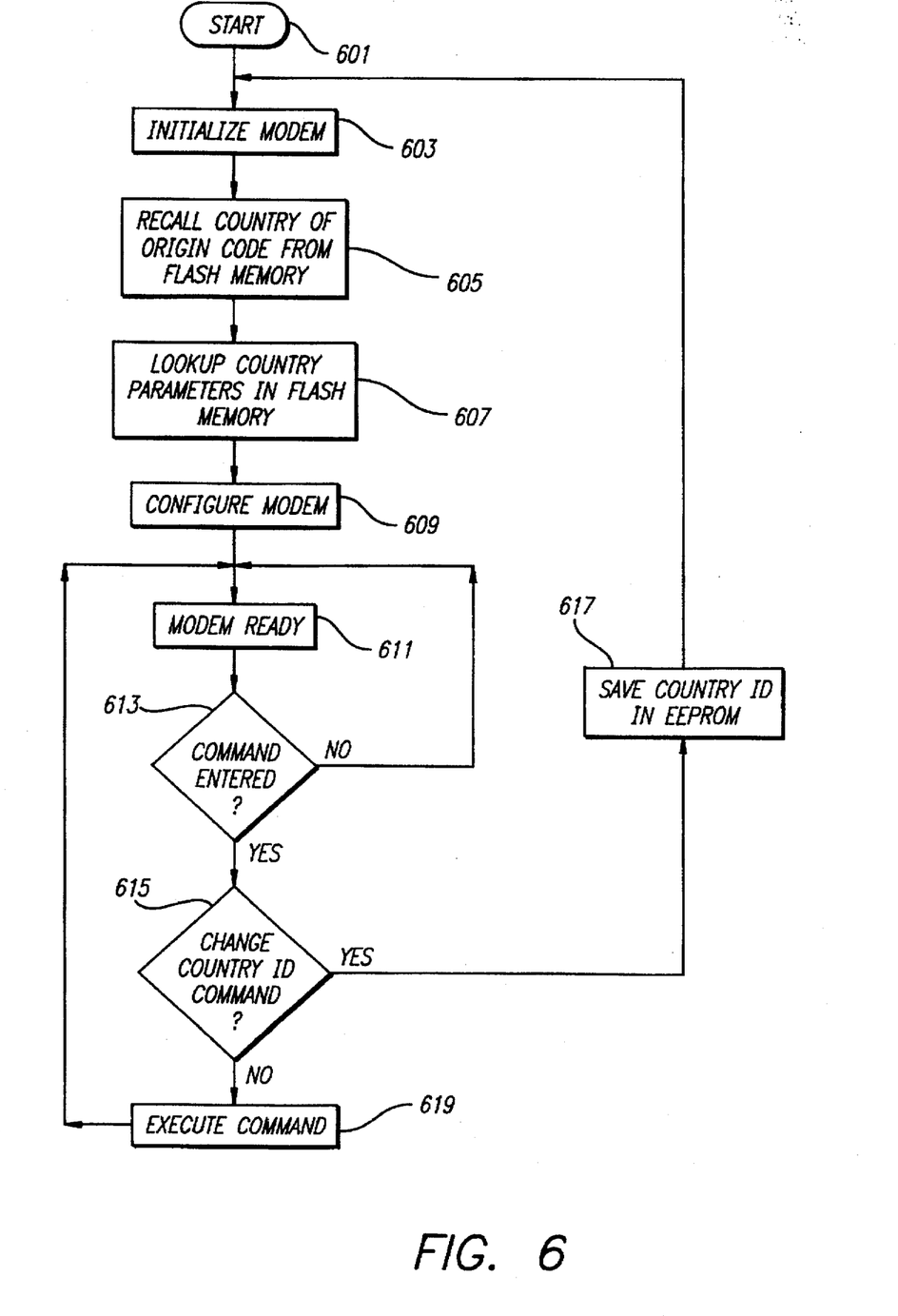
FIG. 6 is a flowchart illustrating the country change routine for modem.

FIG. 6 is a flowchart illustrating modem initialization and reset routine. Upon power-up, modem is initialized in step 603 and modem firmware recalls a home country or country of origin ID code from flash memory 309 and looks up country parameters in flash memory 309 in step 607. In step 609, according to the country parameters obtained in step 607, the setup routine configures modem 300 to adapt to a particular country. As explained above, this configuring step involves setting appropriate country parameters to accommodate a particular country's system requirements such as call progress tones and ringing cadences.

When modem 300 is ready for data transmission, the setup routine checks if any command has been entered in step 613. If a command is entered by a user, the routine checks if the command is a change country ID command at step 615. If it is determined to be a country ID change command, the setup routine saves a new country ID code in EEPROM 313 and proceeds to step 603. If it is not a country ID change command, the routine executes the command entered at step 613 and continues at step 611.

One of the requirements of the international telephone administrations is that a modem revert to the country of origin by default. This requirement does not lend itself to the manufacture of a single modem version with no country setting.

Figure 7:
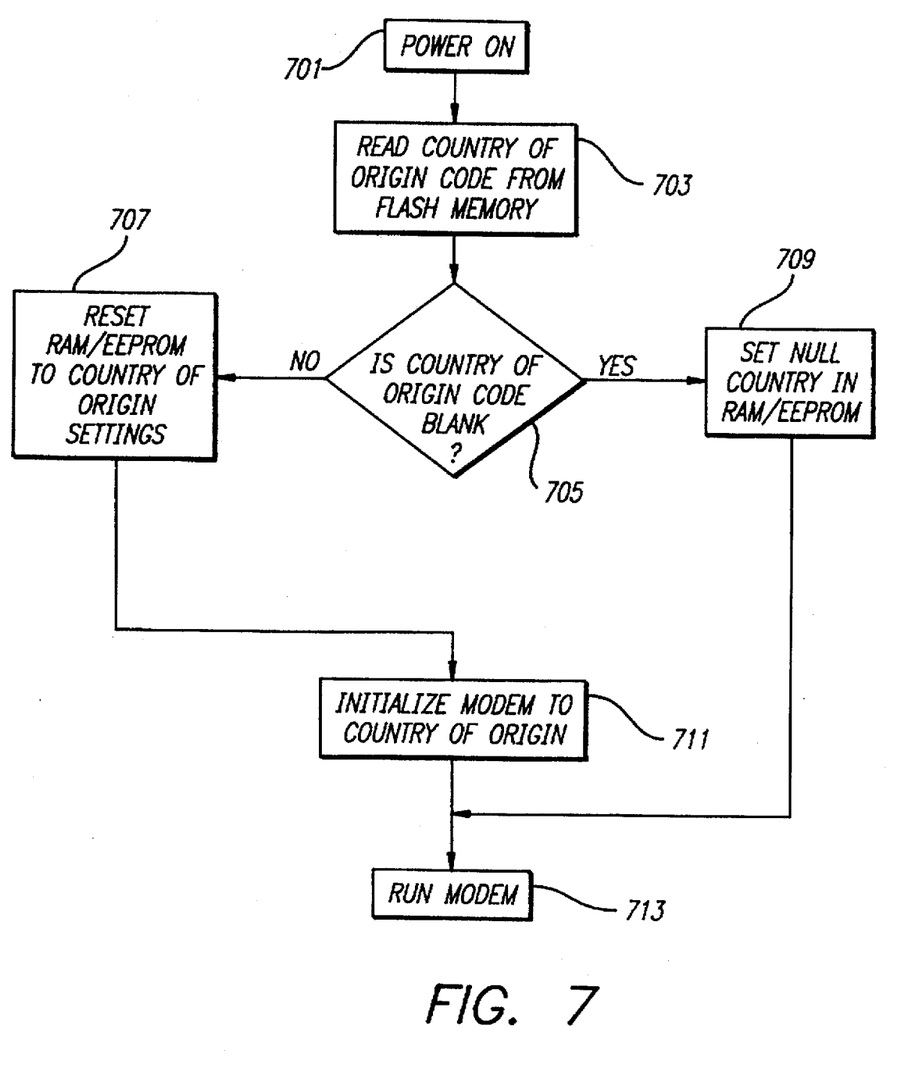
FIG. 7 is a flowchart illustrating the home country reversion scheme.

The present invention provides the default home country reversion scheme as shown in FIG. 7. After modem 300 is reconfigured to a particular country, a user may revert modem 300 back to its default home country configuration. In step 703, after power-up in step 701, the modem firmware initialization routine reads country of origin ID code from flash memory 309 in modem 300. If the country of origin code is not valid or is blank in step 705, modem 300 sets "NULL" country settings in RAM 311 and EEPROM 313 in step 709. If the current country ID code is a valid country code, in step 707 the routine resets RAM 311 and EEPROM 313 in modem 300 to the country of origin settings for a user to operate. In step 711, modem 300 is initialized according to country of origin settings for further operations, thereby completing the default home country reversion routine.

The internal operation of modem 300 described above is transparent to the user and the user is only required to interact with modem setup program to configure the modem without having to know modem's operational details.

It is understood that particular embodiments described herein should not limit the present invention thereby. This invention can be practiced in connection with communication network other than telephone network. For example, the present invention can be used to connect to digital communication network without modulation/demodulation circuitry.

Thus apparatus and method for initial country selection has been described.

We claim:

1. A method for configuring a data communication equipment for initial country selection comprising the steps of:

providing a reconfigurable modem adaptable to a plurality of countries, said modem comprising:
a memory means for storing tables of country parameters for a plurality of countries;
a processing means for processing received information;
a communication network interface means disposed between said processing means and said communication network;
a control means coupled to said memory means, said processing means, and said communication network interface means;
providing a country identifier coupled to said modem, said country identifier comprising a country label that visually displays a country identification code;
entering said country identification code displayed on said country label into a setup routine:
said setup routine causing said control means to access said tables in said memory means, to obtain country parameters according to said country identification code and to load said processing means and said communication network interface means with said country parameters.

2. The method of claim 1 wherein said memory means contains a default home country ID code and parameters for a default home country and a current country ID code and parameters for a current country.

3. The method of claim 2 further comprising country reversion steps of:
reading said default home country ID code from said memory means;
setting said default home country ID and parameters in said processing means and said communication network interface means;
initializing said data communication apparatus such that said data communication apparatus is configured for said default home country.

4. The method of claim 2 wherein said memory means comprises a FLASH memory for storing an initial setup configuration information.

5. The method of claim 1 wherein said country label is provided on a country connector.

6. The method of claim 1 wherein said country label is provided on a modem case.

7. The method of claim 1 wherein said country label is provided on a modem shipping box.

8. The method of claim 1 further comprises providing a computer to provide said setup routine.

9. The method of claim 1 said memory means comprises an EEPROM (Electrically Erasable Programmable Read-only Memory) for storing an initial setup configuration information.

10. An apparatus for connecting a data terminal equipment to a communication network comprising:
a data communication apparatus adaptable to a plurality of countries, said data communication apparatus comprising:
a memory means for storing tables of country parameters for a plurality of countries;
a processing means for processing received information;

a communication network interface means disposed between said processing means and said communication network;

a control means coupled to said memory means, said processing means, and said communication network interface means wherein said control means accesses said tables in said memory means, obtains country parameters, and loads said processing means and said communication network interface means with said country parameters;

a country identifier coupled to said data communication apparatus, said country identifier comprising a country label that visually displays a country identification code.

11. The apparatus of claim 10 wherein said country identifier is provided on a country connector.

12. The apparatus of claim 10 wherein said country identifier is provided on a modem shipping box.

13. The apparatus of claim 10 wherein said country identifier is provided on a modem case.

14. The apparatus of claim 10 further comprising a programming means for providing a setup routine for initially configuring said data communication apparatus according to said country label.

15. The apparatus of claim 10 wherein said memory means comprises a first memory for storing tables of configuration parameters for a plurality of countries, a second memory for storing current country ID code and country parameters of a country for which said data communication apparatus is configured.

16. The apparatus of claim 10 wherein said memory means contains country ID code and parameters for default home country and for current country.

17. The apparatus of claim 10 wherein said country label is in accordance with T.35 country codes.

18. The apparatus of claim 10 wherein said country label is in accordance with standard country codes.

19. A method for configuring a data communication equipment for initial country selection comprising the steps of:

providing a reconfigurable modem adaptable to a plurality of countries, said modem comprising:
a memory means for storing tables of country parameters for a plurality of countries, said memory means containing a default home country ID code and parameters for a default home country and a current country ID code and parameters for a current country;
a processing means for processing received information;
a communication network interface means disposed between said processing means and said communication network;
a control means coupled to said memory means, said processing means, and said communication network interface means;

providing a country identifier coupled to said modem, said country identifier containing a country label of a country identification code;

said control means accessing said tables in said memory means and obtaining country parameters according to said country label and loading said processing means and said communication network interface means with said country parameters;

reading said current country ID code from said memory means;

reading said default home country ID code from said memory means;

comparing said current country ID code with said default home country ID code;

setting said default home country ID and parameters in said processing means and said communication network interface means;

initializing said data communication apparatus such that said data communication apparatus is configured for said default home country.

20. The method of claim 19 further comprising the step of providing a setup routine for initially configuring said data communication apparatus according to said country identifier.

21. The method of claim 19 wherein said country label is provided on a country connector.

22. The method of claim 19 wherein said country label is provided on a modem case.

23. The method of claim 19 wherein said country label is provided on a modem shipping box.

24. The method of claim 19 further comprises providing a computer to provide said setup routine.

25. The method of claim 19 wherein said memory means comprises a flash memory for storing an initial setup configuration information.

26. The method of claim 19 said memory means comprises an EEPROM for storing an initial setup configuration information.

27. An apparatus for connecting a data terminal equipment to a communication network comprising:

a data communication apparatus adaptable to a plurality of countries, said data communication apparatus comprising:
a memory means for storing tables of country parameters for a plurality of countries;
a processing means for processing received information;
a communication network interface means disposed between said processing means and said communication network;
a control means coupled to said memory means, said processing means, and said communication network interface means wherein said control means accesses said tables in said memory means, obtains country parameters, and loads said processing means and said communication network interface means with said country parameters;
a country identifier coupled to said data communication apparatus, said country identifier containing a country label of a country identification code; and
said memory means comprising a first memory for storing tables of configuration parameters for a plurality of countries and a second memory for storing a country ID code and country parameters of a current country for which said data communication apparatus is configured.

28. The apparatus of claim 27 wherein said communication network interface means comprises a data pump and a DAA (Data Access Arrangement) coupled to said data pump.

29. The apparatus of claim 28 wherein said control means comprises a microcontroller.

30. The apparatus of claim 29 wherein said data terminal equipment comprises a PCMCIA-compatible computer.

31. The apparatus of claim 30 further comprising a PCMCIA (Personal Computer Memory Card International Association) interface coupled to said control means and to said data terminal equipment.

32. The apparatus of claim 27 further comprising a programming means for providing a setup routine for initially configuring said data communication apparatus according to said country identification code.

33. The apparatus of claim 27 wherein said country identification code is in accordance with T.35 country codes.

34. The apparatus of claim 27 wherein said country identification code is in accordance with standard country codes.

35. An apparatus for connecting a data terminal equipment to a communication network comprising:
 a data communication apparatus adaptable to a plurality of countries, said data communication apparatus coupled to said data terminal equipment, said data communication apparatus comprising:
  a memory means;
  a communication network interface means coupled to said communication network;
  a control means coupled to said memory means and said communication network interface means wherein said control means receives a command from said data terminal equipment, accesses said tables in said memory means, obtains country parameters, and loads said communication network interface means with said country parameters;
 said memory means comprising a first memory for storing tables of configuration parameters for a plurality of countries and a second memory for storing a country ID code and country parameters of a current country for which said data communication apparatus is configured.

36. The apparatus of claim 35 wherein said communication network interface means comprises a data pump and a DAA (Data Access Arrangement) coupled to said data pump.

37. The apparatus of claim 36 wherein said control means comprises a microcontroller.

38. The apparatus of claim 37 wherein said microcontroller comprises a UART (Universal Asynchronous Receiver Transmitter), a microprocessor, and a gate array.

39. The apparatus of claim 38 wherein said data terminal equipment comprises a PCMCIA-compatible computer.

40. The apparatus of claim 39 further comprising a PCMCIA (Personal Computer Memory Card International Association) interface coupled to said control means and to said data terminal equipment.

41. The apparatus of claim 38 wherein said data terminal equipment comprises a processor and a second memory means coupled to said processor.

42. The apparatus of claim 35 wherein said first memory comprises a flash memory.

43. The apparatus of claim 42 wherein said second memory comprises a RAM (Random Access Memory).

44. The apparatus of claim 35 wherein said memory means comprises a EEPROM (Electrically Erasable Programmable Read-only Memory).

45. The apparatus of claim 35 further comprising a country identifier coupled to said data communication apparatus, said country identifier containing a country label of a country identification code.

46. The apparatus of claim 45 further comprising a programming means for providing a setup routine for initially configuring said data communication apparatus according to said country identification code.

47. An apparatus for connecting a data terminal equipment to a communication network comprising:
 a data communication apparatus adaptable to a plurality of countries, said data communication apparatus coupled to said data terminal equipment, said data communication apparatus comprising:
  a memory means;
  a communication network interface means coupled to said communication network;
  a control means coupled to said memory means and said communication network interface means wherein said control means receives a command from said data terminal equipment, accesses said tables in said memory means, obtains country parameters, and loads said communication network interface means with said country parameters;
 said memory means storing tables of configuration parameters for a plurality of countries, a country ID code and configuration parameters of a current country for which said data communication apparatus is configured.

48. The apparatus of claim 47 wherein said memory means comprises a first memory for storing said tables of configuration parameters and a second memory for storing said country ID and said configuration parameters for said current country.

49. A method for configuring a data communication equipment for initial country selection comprising the steps of:
 providing a reconfigurable modem adaptable to a plurality of countries, said modem comprising:
  a memory means for storing tables of country parameters for a plurality of countries, said memory means containing a default home country ID code and parameters for a default home country and a current country ID code and parameters for a current country;
  a processing means for processing received information;
  a communication network interface means disposed between said processing means and said communication network;
  a control means coupled to said memory means, said processing means, and said communication network interface means;
 providing a country identifier coupled to said modem, said country identifier containing a country label of a country identification code;
 said control means accessing said tables in said memory means and obtaining country parameters according to said country label and loading said processing means and said communication network interface means with said country parameters;
 reading said default home country ID code from said memory means;
 setting said default home country ID and parameters in said processing means and said communication network interface means;
 initializing said data communication apparatus such that said data communication apparatus is configured for said default home country.

* * * * *